May 7, 1968 R. PISCIOTTA 3,381,556

TIRE CHAIN ADAPTOR

Filed Sept. 19, 1966

INVENTOR
RUSSELL PISCIOTTA

United States Patent Office 3,381,556
Patented May 7, 1968

3,381,556
TIRE CHAIN ADAPTOR
Russell Pisciotta, 10711 W. 67th St.,
Shawnee, Kans. 66203
Filed Sept. 19, 1966, Ser. No. 580,331
2 Claims. (Cl. 81—15.8)

ABSTRACT OF THE DISCLOSURE

A tire chain carrier for aiding in the placement of a tire chain on a vehicle tire, the chain having at its end a spring clamp attachable to the tire for drawing the chain from the carrier and around the tire as the vehicle is advanced. The tire chain carrier, an open top compartment from which the chain is delivered to the tire, has wheels engaging the tire tread and arms on opposite sides of the tire with means for releasably and slidably connecting the carrier to the tire, whereby the carrier moves with the vehicle.

---

It has always been somewhat of a problem to place chains on the tire of a wheel of an automotive vehicle in snow or ice. This is particularly true if the vehicle happens to be a large truck or bus.

It is therefore the principal object of this invention to provide a tire chain adaptor that permits one to place the chains on even the largest of tires in a minimum of time and with a minimum of effort.

Another object of this invention is to provide a tire chain adaptor of the character described, that can be used for placement of chains on any size of tire normally found on automotive vehicles.

Still another object of this invention is to provide a tire chain adaptor that consists of but three major parts of which one is used as a container for the other two parts when the device is not in use.

With the foregoing and other objects in view, I have devised the construction of the tire chain adaptor illustrated in the accompanying drawing forming a part of this specification. It will, however, be understood that various changes and modifications may be employed within the scope of the invention.

Figure 3:
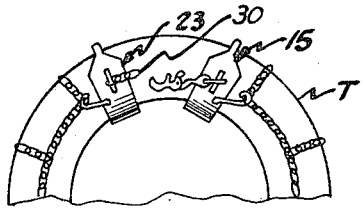
FIG. 3 is a side view of a portion of a tire having its chain placed thereon by the use of this invention.

This invention, of which as has been previously stated, there are two, one for each rear wheel of a vehicle, although only one is shown in the accompanying drawing, consists of three major parts, namely, the first one of which is a metal box 10 having a semi-circular opening in the upper edge of the end 11. The opening is the same configuration as that of the cross-section of the tire of an automotive vehicle. Two spaced rollers 12 are so mounted in the lower portion of the aforesaid end 11 of the metal box 10, which I personally hereinafter call a chain carrier or carrier, so as to permit the carrier to be rolled on the ground. A U-shaped guide rod 13 is secured to the aforesaid carrier 10 by means of a plurality of fixed metal clips 14 of which only two are shown in the drawing.

Figure 2:
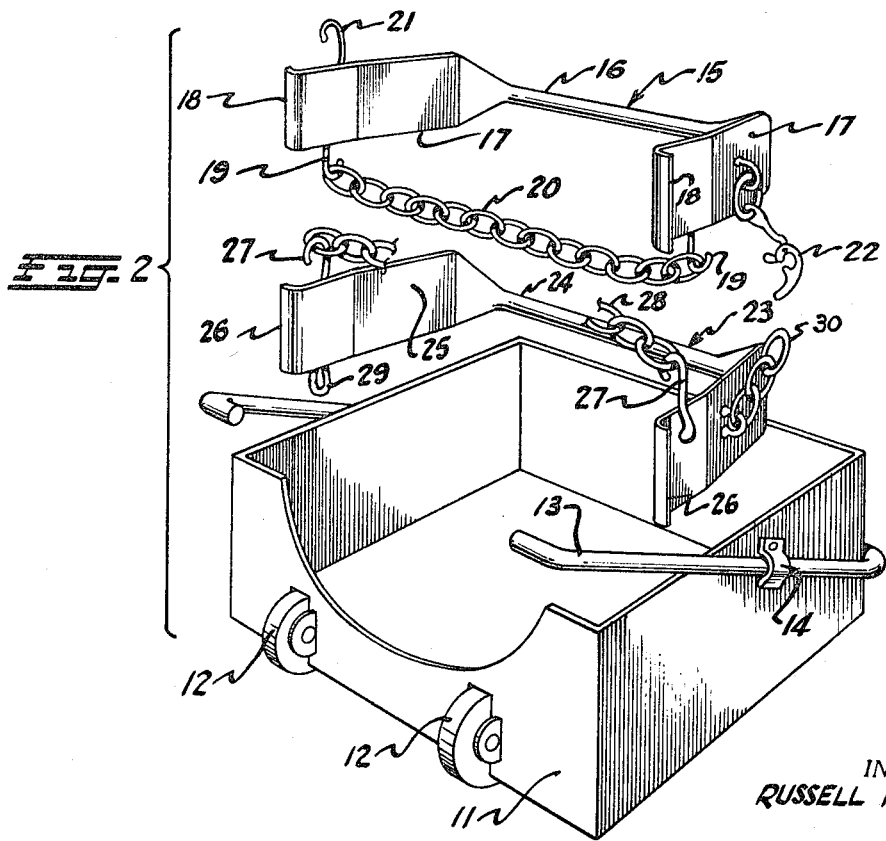
FIG. 2 is a pictorial exploded view of the three separate parts of this invention.

The second major part of this invention is a metal U-shaped lead clamp 15 which embodies a cross-bar 16 that is provided with a rough external surface which is not visible in any of the views of the drawing. Each end of the aforesaid cross-bar is integrally formed with a side plate 17 that has an outwardly turned outer edge 18, as clearly shown in FIGURE 2 of the accompanying drawing where it is also seen that each side plate is also provided with a J-shaped hook 19 to which is secured one end of the chain 20. An elongated metal hook 21 projects outwardly from the opposite edge of one of the side plates 17 from which is secured one of the aforesaid J-shaped hooks 19, while a clinch fastener 22 has one end suitably secured to the outside surface of the other one of the two side plates 17 that is opposite the one to which is secured the aforesaid metal hook 21. Clamp 15 is of spring material so that it will grip the tire.

The third major part of each one of the two tire chain adaptors is the metal U-shaped follower clamp that is indicated in the drawing in its entirety by the reference number 23. The follower clamp 23 embodies a cross-bar 24 that is identical to the cross-bar 16 of the already described lead clamp 15. Each end of the aforesaid cross-bar 24 is likewise integrally formed with a side plate 25 that is at right angle to the cross-bar. Each side plate 25 which has an outwardly turned edge 26, is provided with J-shaped hooks 27 to which is secured on each end of the chain 28 that goes over the tread of the tire that is indicated in the accompanying drawing by the capital letter T. Follower clamp 23 also has an eye 29 to cooperate with hook 21 of clamp 15.

From the foregoing it will be seen that I have described the detail construction of my invention of a tire chain adaptor which is now used in the following manner.

Before telling exactly how this novel invention is used, it should be realized that in actual practice, one must have two complete sets of the above-described structures, one for the right gear wheel of the vehicle, and one for the left rear wheel. Each piece of each set of the adaptors shall be clearly marked "right" or "left" as the case may be. When the adaptors are not in use, the two pieces of each adaptor, namely, the aforesaid lead clamp 15 and the follower clamp 23 are stored in the carrier 10 along with the chain for the tire. The two complete sets of adaptors and tire chains are now stacked one upon the other and stored in any desired place, either in the luggage compartment of the vehicle or in a garage or other suitable building.

Figure 4:
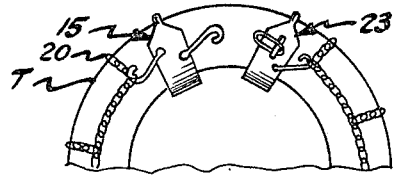
FIG. 4 is a view of a portion of the other side of a tire having its chain placed thereon by the use of this invention.
Figure 1:
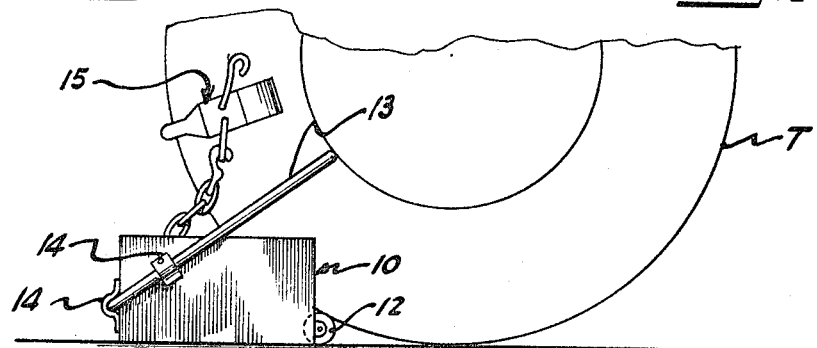
FIG. 1 is a side view of this invention in use.

When it is desired to place a chain on a vehicle tire, all one has to do is to take the proper carrier 10 and slip it behind the correct wheel of the vehicle, and then do the same thing with the other one of the carriers 10. The guide rod 13 has its outer or free ends placed between the tire and the rim of its wheel in order to keep the carrier 10 in line with the wheel. The two rollers 12 on the end of the carrier allow the device to be rolled on the tire T. The U-shaped lead clamp 15, which is made of spring steel, is placed on the tire, as shown in FIGURE 1 of the drawing, and one gets in the vehicle and moves the same approximately five feet, or until the tire chains substantially encompassing the wheels as shown in FIGURES 3 and 4, when U-shaped follower clamp 23 is put in place and secured to the tire chain; now one gets out of the vehicle and with the palm of the left hand, pushes down on the outside of the clamp 23 until the hook 21 engages into the aforesaid elongated metal eye 29 of the U-shaped follower clamp 23. After doing this, take the already mentioned clinch fastener 22 and insert the same into the first link of chain 30. Now close the clinch fastener 22 in a locked position. After doing this, the chains are on one of the wheels of the vehicle. Now pull both carriers 10 away from the car and store wherever one may desire.

Although it has not been previously stated, it should be realized by those experienced in the art, that the two chains 20 and 28 are actually a part of the complete tire chain of the wheel.

What I now claim as new and desire to secure by Letters Patent is:

1. A device for aiding the placement of chains on vehicle tires comprising, an open top, hollow box-like chain carrier, said carrier having an opening in one wall thereof of the same general configuration as the profile of a tire, arm means extending outwardly from said carrier and located on each side of said opening, means on said arms for releasably and slidably connecting said carrier to a tire, and wheels on said carrier adjacent said opening for rotatably engaging a tire, whereby when a chain end is attached to a tire and the vehicle is moved the carrier moves therewith to deliver a chain to a tire.

2. A device for aiding the placement of chains on vehicle tires comprising, an open top box-like chain carrier, wheels on said carrier for rotatably engaging the tread of a tire, a pair of laterally spaced arms extending outwardly from said carrier for straddling a tire when said wheels are engaged with the tread thereof, and means on said arms for releasably and slidably connecting said carrier to a tire, whereby when a chain end is attached to a tire and the vehicle is moved said carrier moves therewith to deliver a chain to the tire.

References Cited

UNITED STATES PATENTS 2,608,234  8/1952  Hughes _____ 152—241 X
2,768,545  10/1956  Bertelsen _____ 81—15.8

OTHELL M. SIMPSON, *Primary Examiner*.